INVENTOR.
Johannes Kwaak
BY
Christel & Bean
ATTORNEYS.

INVENTOR.
Johannes Kwaak
BY
Christel+Bean
ATTORNEYS.

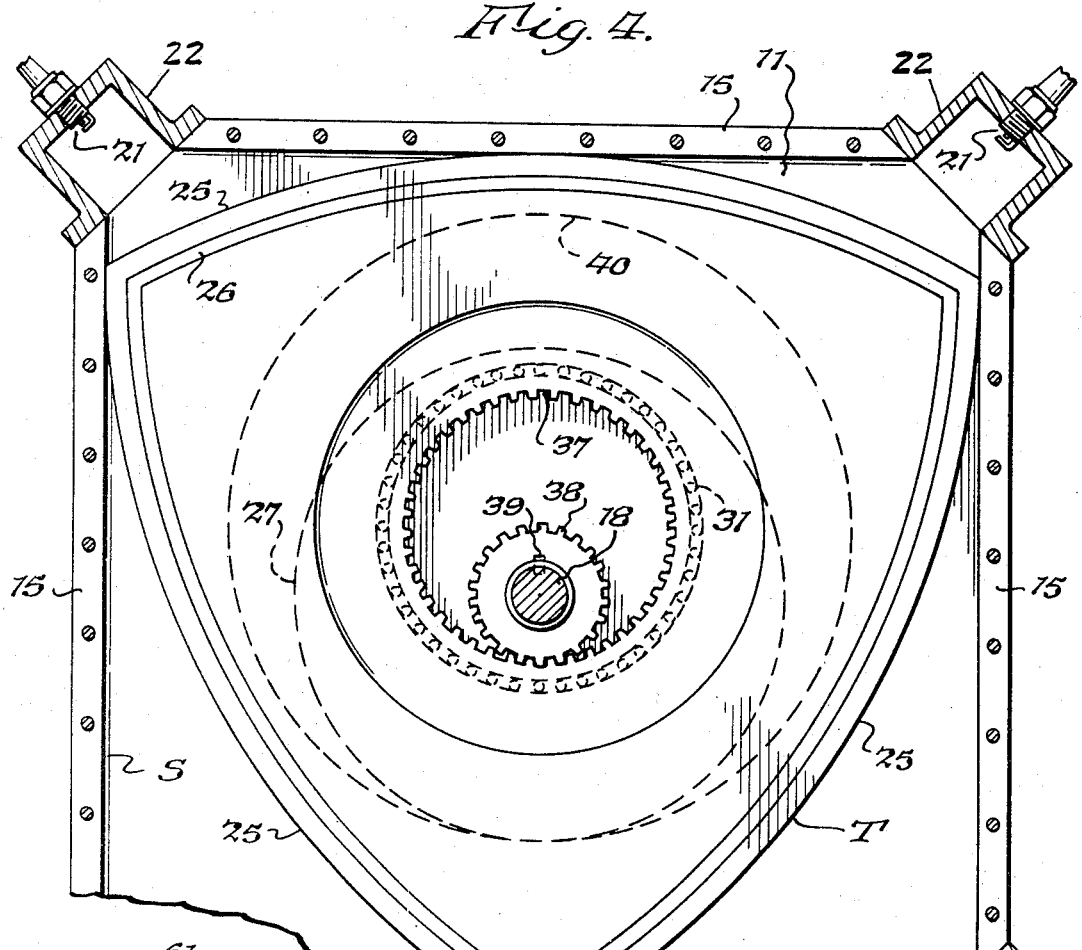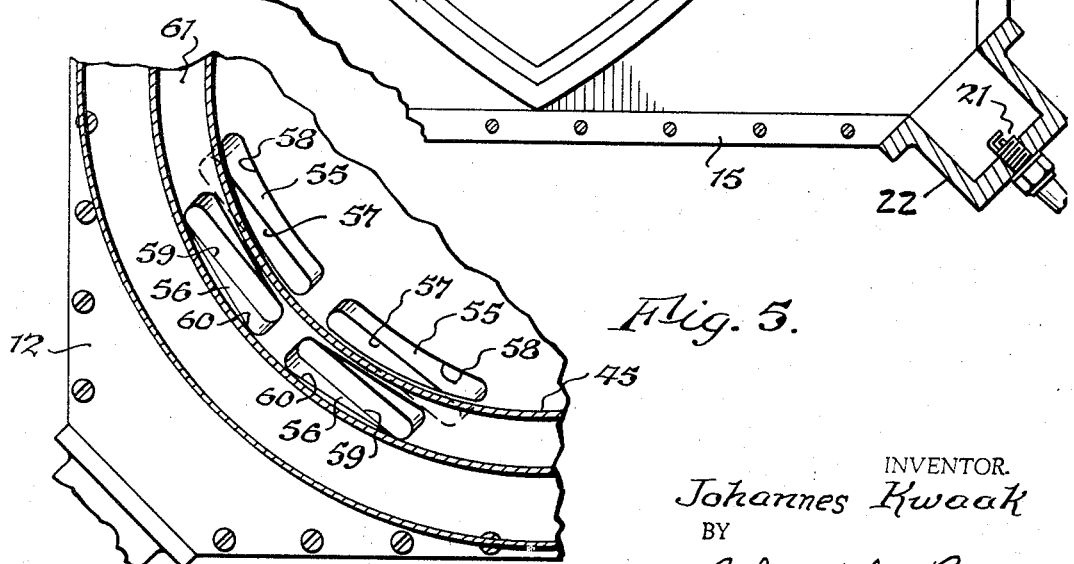

United States Patent Office 3,441,007
Patented Apr. 29, 1969

3,441,007
ROTARY PISTON ENGINE
Johannes Kwaak, 11 Orchard Drive, Port Colborne,
Ontario, Canada
Filed Nov. 10, 1966, Ser. No. 593,550
Int. Cl. F02b 53/00, 55/00; F04c 17/02
U.S. Cl. 123—8                     5 Claims

ABSTRACT OF THE DISCLOSURE

A rotary engine having a housing with peripheral wall portions defining a square cavity. A triangular piston in the cavity has arcuate edges forming working surfaces opposite the peripheral wall portions and cooperating therewith to form a plurality of variable volume chambers. The piston is mounted on the workshaft for rotation in the cavity, following the peripheral wall portions by an eccentric mounted for rotation about an axis coincident with the axis of the workshaft, a pair of drive gears carried by the workshaft, a gear carried by the piston and having a axis coincident with the piston axis engaging one of the drive gears for rotation thereabout, and planetary gears engaging the other drive gear, the eccentric carrying a gear for engaging the planetary gears.

---

This invention relates to rotary engines and more particularly to an engine having a triangular piston rotatable in a square casing.

Conventional rotary engines utilize a piston rotatable within a casing with the spaces between the peripheral edges of the rotor and the casing sequentially forming multiple compression and expansion chambers. To achieve this rotation and form such chambers, the shape of both piston and casing are ordinarily designed by reference to particular single or multi-lobe epitrochoidal curves. However, in each design, both the epitrochoidally shaped piston and the casing must be precision machined to define the chambers and permit the piston to follow the contour of the casing while maintaining chamber definition. Manufacturing tolerances are accordingly critical and rotary engines of this type are proportionately more expensive.

Moreover, the pistons of ordinary rotary engines react against opposite sides of their casings during their rotary motion. The frictional engagement created between the piston and casing sides retards the piston and causes intermittent, non-uniform rotary motion. Additionally, continuous frictional engagement wears the rotary piston and casing and permits blow-by between adjacent chambers, thereby reducing overall efficiency.

Apex seals are usually disposed on the peripheral surface of the piston to provide seals between adjacent chambers. Such seals, however, are complicated by the epitrochoidal shape of the piston and casing, are extremely difficult to maintain for efficient operation and are usually custom designed for use with the particular epitrochoidal curve utilized. While various types of seals have been proposed, blow-by between chambers and resulting lack of efficiency remains a problem.

Accordingly, it is a primary object of this invention to provide a rotary engine having a piston rotatable in a casing wherein both piston and casing can be simply and economically constructed.

It is also an object of the present invention to provide a rotary engine having a rotating piston which is positively spaced with working clearance from its casing for all rotary positions thereof.

It is another object of the present invention to provide a rotary engine wherein separate seals are not required between the working surfaces of the piston and the casing.

It is a further object of the present invention to provide a rotary engine of the internal combustion type having a piston which does not react against the periphery of its casing to attain its reactive or rotary force.

In one aspect thereof, the present invention is characterized by the provision of a rotary engine having a housing including axially spaced end walls and peripheral wall portions interconnecting the end walls, the peripheral wall portions defining a square cavity in axial cross section, a workshaft received in the housing, a triangular piston in the cavity having arcuate edges forming working surfaces opposite the peripheral wall portions, the working surfaces and apexes of the triangular piston cooperating with the end walls and peripheral wall portions to form a plurality of variable volume chambers, and means mounting the piston on the workshaft for rotation in the cavity and constraining the piston surfaces to follow the peripheral wall portions.

Various other novel features of construction and advantages inherent in the present invention are pointed out in detail in the following description of an illustrative embodiment thereof considered in conjunction with the accompanying drawing wherein like numerals represent like parts throughout the various views and wherein:

FIG. 4 is a fragmentary vertical cross-sectional view taken about on line 4—4 of FIG. 3;

FIG. 5 is an enlarged fragmentary cross-sectional view of corner of the engine taken about on line 5—5 of FIG. 3.

Figure 3:
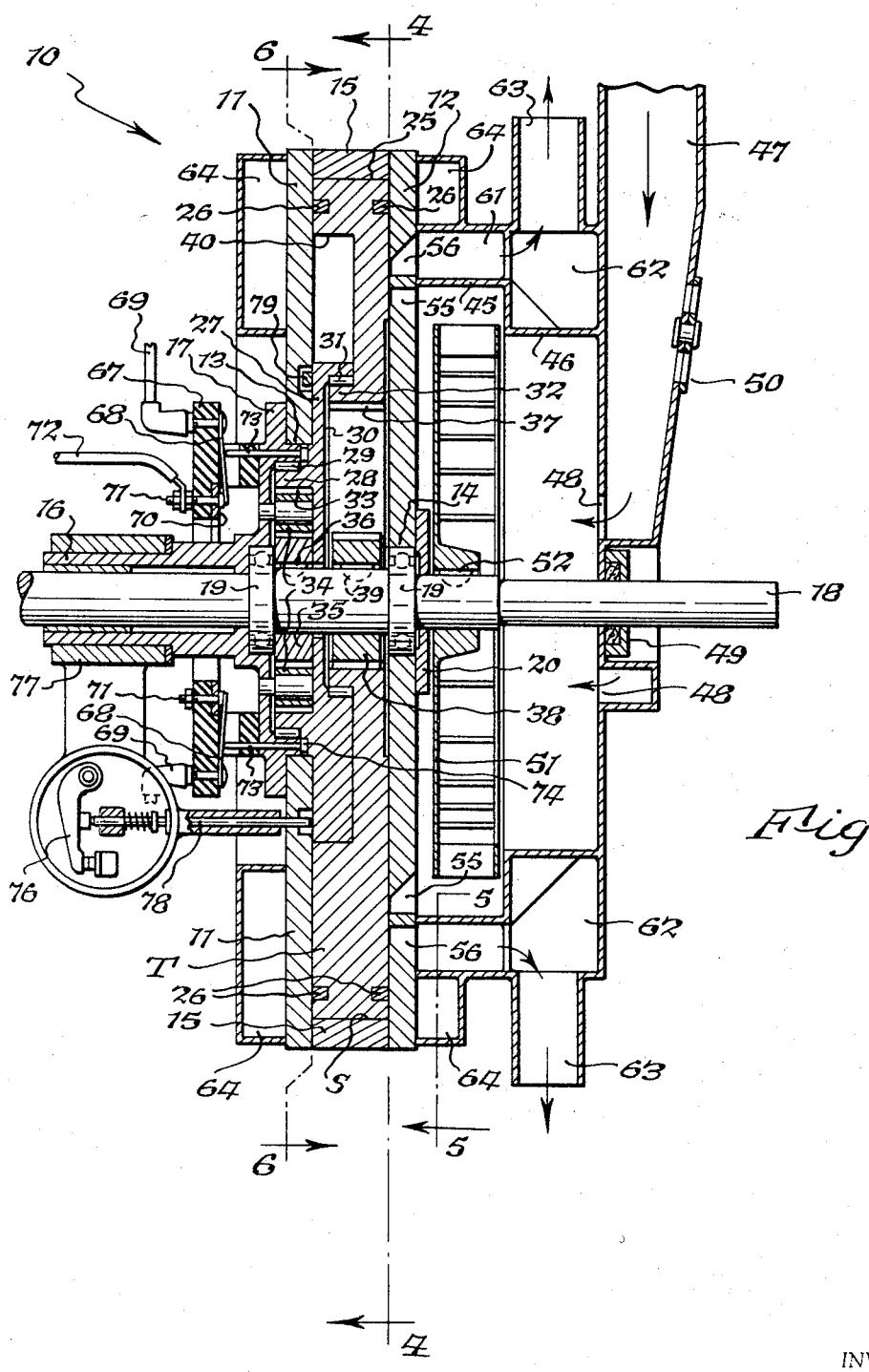
FIG. 3 is a fragmentary vertical sectional view taken about on line 3—3 of FIG. 1.
Figure 6:
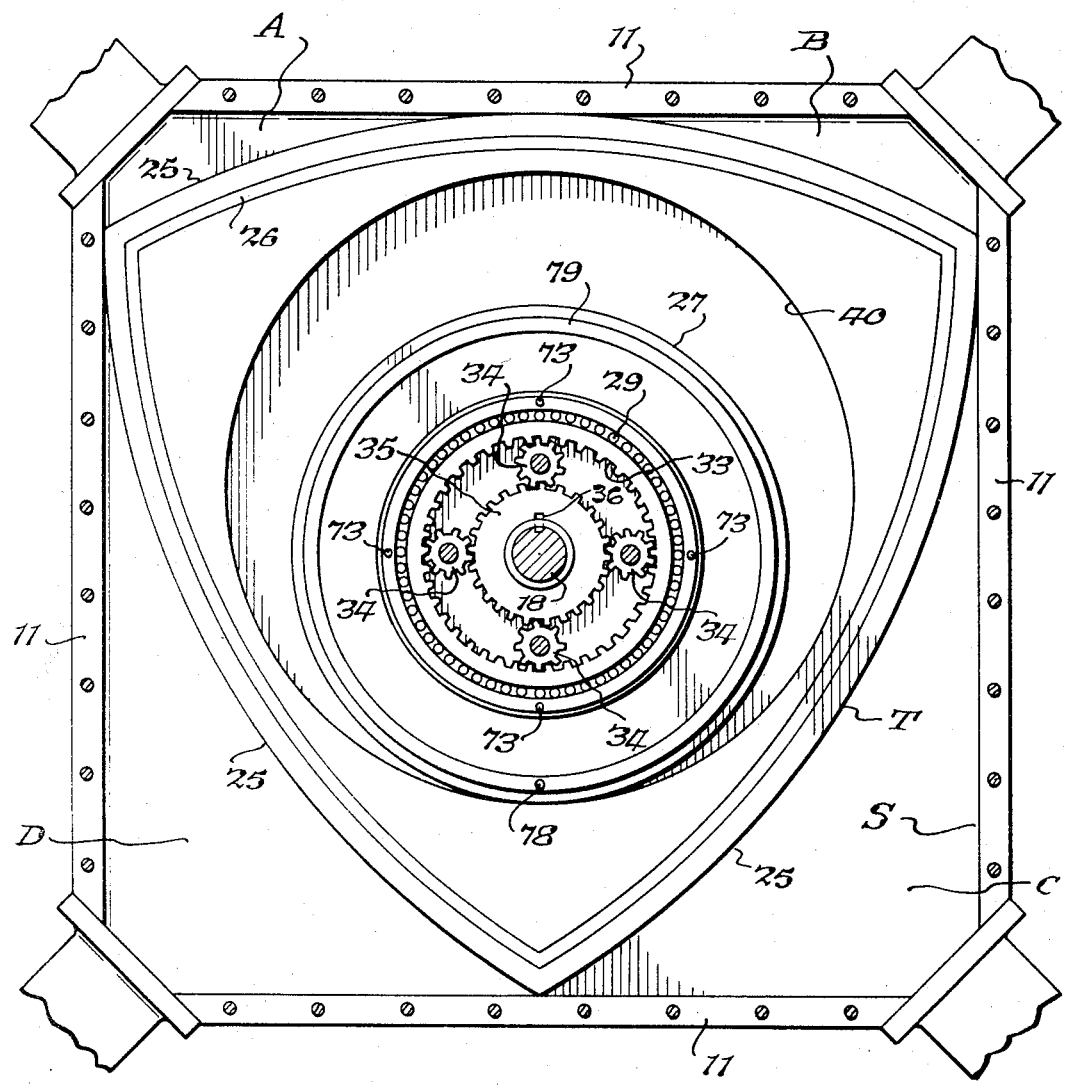
FIG. 6 is a fragmentary vertical cross-sectional view taken about on line 6—6 of FIG. 3.

Referring to the drawings, in particular to FIG. 3, one form of a rotary engine constructed in accordance with the present invention is generally designated 10 and comprises an outer casing or housing having axially spaced end walls 11 and 12 with central openings 13 and 14, a peripheral wall including pairs of oppositely disposed parallel wall members 15 connecting end walls 11 and 12 and forming a square chamber or cavity S as best illustrated in FIGS. 4 and 6, and an outwardly projecting sleeve 16 having a radial head 17 at one end suitably secured by bolts or the like, not shown, to end wall 11 about opening 13. A workshaft 18 passes through openings 13 and 14 on an axis coincident with the center of square chamber S and is journaled in sleeve 16 and opening 14 on appropriate bearings 19. Workshaft 18 is retained against axial displacement by a collar 20 suitably secured to end wall 12 and an abutment on sleeve 16, both of which bear against the respective races of bearings 19.

While the specific form of rotary engine herein illustrated is a rotary internal combustion engine, other engines, such as compressors, vacuum and liquid pumps and the like can be constructed in accordance with and without departing from the scope of the principles of the present invention. As illustrated in FIG. 4, a spark plug 21 is mounted adjacent each corner of the square chamber in a suitable housing 22. While spark plugs 21 are illustrated as spaced outwardly beyond the corners of square chamber S, spark plugs 21 may be positioned at the corners of chamber S or may project slightly inwardly into chamber S, if desired.

An equal-distance triangular piston T having arcuate peripheral working surfaces 25 disposed opposite peripheral walls 15 is mounted within housing 10. Surfaces 25 are arcs of circles having their centers at opposite apexes of the triangular piston with each having a radius from its opposite apex equal to the length of a side of square cavity S less a working clearance. The center C' of triangular piston T (FIG. 2) is defined by the intersection of straight lines joining the apexes with medial points on their opposed arcuate surfaces 25 and is radially offset from the coincident axis of the workshaft 18 and square cavity S. Working surfaces 25 cooperate with end walls 11, 12 and peripheral wall members 15 to form four compression and expansion chambers A, B, C and D adjacent the corners of square cavity S. Suitable seals 26 are disposed in arcuate grooves formed along opposite faces of piston T adjacent peripheral surfaces 25 and bear against end walls 11 and 12.

To provide for simultaneous revolution and rotation of piston T in its casing with working surfaces 25 constrained to follow the square peripheral wall and to drive workshaft 18 from piston T, a piston support assembly is provided comprising an eccentric 27 having a hub 28 journaled in head 17 on roller bearings 29 for rotation around an axis coincident with the axis of workshaft 18. Eccentric 27 has a cylindrical recess 30 on its inner face which is radially offset so as to be eccentric relative to shaft 18. Piston T has a central hub 32 journaled in recess 30 on roller bearings 31 whereby piston T is carried by eccentric 27 for rotation around its center C'. Hub 28 of eccentric 27 is internally geared at 33 for rotation on four planetary gears 34 secured about head 17 with gears 34 engaging a spur or drive gear 35 keyed on workshaft 18 at 36. Piston T has an internal gear ring 37 which engages a spur or drive gear 38 keyed to workshaft 18 at 39, the axis of gear ring 37 being coincident with center C' of piston T. A circular recess 40 is formed in one face of piston T to accommodate ecentric 27 as piston T rotates around offset axis C' on bearing 31 and revolves about the coincident axes of workshaft 18 and cavity S.

Figure 1:
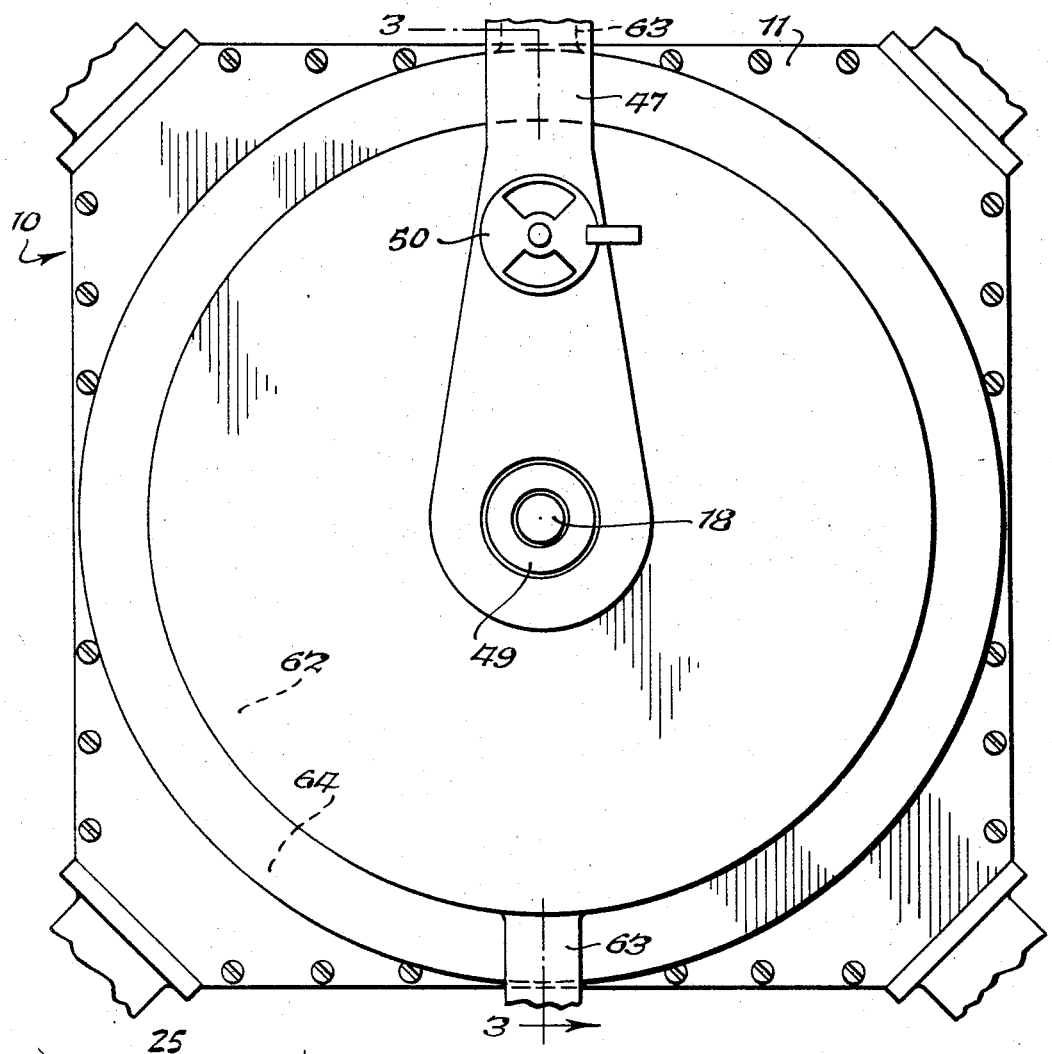
FIG. 1 is a fragmentary end elevational view of one form of a rotary engine constructed in accordance with the present invention.
Figure 2:
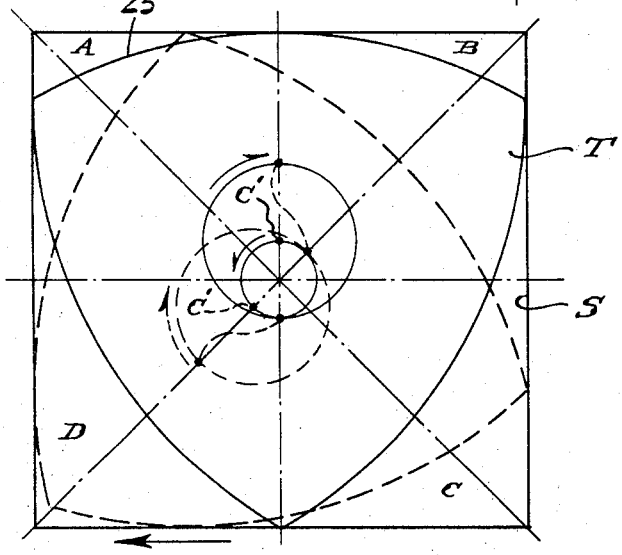
FIG. 2 is a schematic representation thereof illustrating the movement of the triangular piston within its square casing.

To illustrate the simultaneous revolution and rotation of piston T in the casing, reference is had to FIG. 2 wherein the solid lines represent an initial piston position and the dashed lines a position thereof after, for example, 45° movement in a clockwise direction with the sinuous dashed lines representing the path of particular points on the piston. The larger solid circle and the dashed circle represent internal gear ring 37 with the small solid line circle representing spur gear 38. As piston T rotates clockwise around its center C' in roller bearing 31, eccentric 27 rotates counterclockwise around the axis of workshaft 18 and revolves piston T about the workshaft axis so that ring gear 37 assumes the dashed line configuration with its center at the dashed C'. In other words, the offset axis C' of piston T revolves about the workshaft axis a fixed distance therefrom in a direction opposite to the rotation of the piston around offset axis C' and opposite to the direction of rotation of workshaft 18 which is driven by the engagement of spur gear 38 and gear ring 37, and eccentric gear assembly 33, 34 and 35, respectively.

To complete the rotary internal combustion engine, a fuel intake and exhaust system is provided comprising a pair of laterally stepped annular housings 45 and 46 opening into one another with housing 45 suitably secured to end wall 12. A fuel-air inlet 47 opens into housing 46 via annular opening 48 and carries a suitable seal 49 sealing about workshaft 18. A valve 50 is disposed in inlet 47 for adjusting the fuel-air mixture. A scavenging fan 51 is keyed on workshaft 18 at 52 for rotation in housing 45.

Two pairs of inlet and outlet ports 55 and 56 respectively, communicate through end wall 12 into each variable volume chamber A, B, C and D and are positioned generally concentrically about the axis of cavity S so that they are sequentially opened and blocked by a face of piston T as the latter rotates in cavity S. Referring to FIG. 5, inlet ports 55 comprise a pair of inner slots 57 arranged in end-to-end relation along the inner face of end wall 12. Slots 57 flare through end wall 12 to form widened arcuate outer slot formations 58 opening into housing 45 adjacent its arcuate periphery. Outlet ports 56 comprise a pair of inner slots 59 arranged in end-to-end relation along the inner face of end wall 12 radially outwardly of inlet ports 55. Slots 59 flare through end wall 12 to form widened arcuate outer slot formations 60 concentric with slot formations 58 and opening into an annular exhaust chamber 61 which is concentric about casing 45. Chamber 61 opens into annular chamber 62 which has a pair of exhaust outlets 63. A water filled jacket 64 is provided about end walls 11 and 12 to cool the engine.

An ignition system is provided and comprises an insulator ring 67 having four electrically conductive leaf springs 68 circumferentially spaced thereabout and connected to respective contacts on spark plugs 21 by leads 69. A conductor ring 70 is secured to insulator ring 67 and has contacts 71 associated with respective leaf springs 68. Conductor ring 70 is connected by a lead 72 to conventional circuitry, not shown, having a source of current and which complete a circuit with each spark plug 21. Four plungers 73 are spaced about head 17 and engage between springs 68 and the inner face of eccentric 27. A cam 74 projects from the inner face of eccentric 27 and the cam surface thereof sequentially engages plungers 73 to move the same outwardly against the bias of springs 68 whereby springs 68 sequentially engage contacts 71 to complete electrical circuits with and fire spark plugs 21 through leads 69.

A normally closed, spring biased, timing switch 76 is carried on a collar 77 which is adjustably secured about sleeve 16. A spring biased plunger 78 engages between switch 76 and a cam ring 79 projecting from the inner face of eccentric 27. Plunger 78 is sequentially displaced axially outwardly against its spring bias by four cam surfaces on ring 79 to sequentially open switch 76. Switch 76 forms a part of conventional circuitry, not shown, which sequentially provides current to conductor ring 70.

The operating cycle of the engine is as follows, assuming clockwise rotation of piston T on its axis C'. With piston T in the solid line position of FIG. 2, ports 55 and 56 associated with chambers A and B are blocked by the side face of piston T and ports 55 and 56 associated with chambers C and D are both open. As piston T rotates, movement of surface 25 in chamber A toward the top of casing S and the left-hand apex of piston T toward diagonal alinement with the spark plug and the axis of cavity S compresses the fuel-air mixture in chamber A. Surface 25 associated with chamber B moves away from top wall as a result of combustion in chamber B which occurred after the right-hand apex of piston T rotated through and beyond diagonal alinement with the upper right-hand spark plug and the axis of cavity S. The ports associated with chamber C are being uncovered while the ports in chamber D are being blocked and scavenging fan 51 is exhausting chamber C and supplying chamber D with the fuel-air mixture. When the piston assumes the dashed line configuration of FIG. 2, chamber A has been fired, the ports of chamber B are open to exhaust the combustion products therein, the ports in chamber C have been blocked and surface 25 associated therewith is compressing the fuel-air mixture therein and the fuel-air mixture in chamber D is fully compressed and ready for firing.

A firing occurs each time an apex of the piston passes a corner spark plug and, in the illustrated form, there are twelve firings for each rotation of the piston. To fire spark plugs 21, switch 76 is opened at the appropriate time by engagement of timing cam surfaces 79 against plunger 78 to provide current to conductor ring 70. Simultaneously, leaf spring 68 associated with the spark plug to be fired is depressed by its plunger 73 to thereby complete the circuit with the spark plug and combust fuel-air mixture in the appropriate chamber. Collar 77 can be rotatably adjusted to advance or retard the spark as desired.

It is seen that the objects of my invention are thus fully accomplished. Piston T reacts against the piston drive and support assembly to simultaneously rotate around axis C' and revolve about the workshaft axis thereby driving workshaft 18 in the direction of piston rotation. Since piston T is positively supported, the working surfaces and apexes which define the combustion chambers do not engage the sides of cavity S and are always spaced a working distance therefrom thus eliminating the need for complicated apex seals. Significantly, the foregoing piston and its mounting permits a triangular piston to rotate within a square casing. Thus, the requirement for manufacturing precision in forming the casing is obviated and piston construction is simplified due to the nature of the piston with its flat sides and edges forming arcs of circles.

What I claim is:

1. In a rotary engine, a housing including axially spaced end walls and peripheral wall portions interconnecting said end walls, said peripheral wall portions defining a square cavity in transverse section, a workshaft received in said housing, a triangular piston in said cavity having arcuate edges forming working surfaces opposite said peripheral wall portions, said working surfaces cooperating with said end walls and peripheral wall portions to form a plurality of variable volume chambers, and means mounting said piston on said workshaft for rotation in said cavity and constraining said piston surfaces to follow said peripheral wall portions, wherein the axis of said workshaft is coincident with the axis of said square cavity and the axis of rotation of said piston is offset from and parallel to the workshaft axis, said mounting means including means for revolving the offset axis of said piston about the axis of said workshaft, wherein said latter means includes an eccentric mounted for rotation about an axis coincident with the axis of said workshaft whereby the rotation of the eccentric around said workshaft is in the opposite direction to the rotation of said workshaft, said piston being rotatably carried by said eccentric for rotation around its offset axis whereby the latter piston rotation is in the opposite direction to the revolving of the piston axis about the axis of said workshaft, and wherein said mounting means further includes a pair of drive gears carried by said workshaft, said piston carrying a gear having an axis coincident with the piston axis and engaging one of said drive gears for rotation about the latter, and planetary gears engaging the other of said drive gears, said eccentric carrying a gear for engaging said planetary gears.

2. In a rotary engine, a housing including axially spaced end walls and peripheral wall portions interconnecting said end walls, said peripheral wall portions defining a square cavity in transverse section, a workshaft received in said housing, a triangular piston in said cavity having arcuate edges forming working surfaces opposite said peripheral wall portions, said working surfaces cooperating with said end walls and peripheral wall portions to form a plurality of variable volume chambers, and means mounting said piston on said workshaft for rotation in said cavity and constraining said piston surfaces to follow said peripheral wall portions, wherein said piston is an equal distance triangular piston with said arcuate working surfaces forming arcs of circles having their centers at the opposite apexes of said triangle and having a radius substantially equal to the length of the side of said square cavity, and wherein said mounting means includes a pair of drive gears carried by said workshaft, a gear carried by said piston and engaging one of said drive gears, planetary gears engaging the other of said drive gears, an eccentric carrying a gear engaging said planetary gears, said piston being rotatably carried by said eccentric for rotation around an axis offset from and parallel to the axis of said workshaft whereby piston rotation around its offset axis is in the opposite direction as the rotation of the piston axis about the axis of the workshaft.

3. A rotary engine according to claim 1 wherein said engine is a rotary internal combustion engine having combustion means disposed in at least one of said chambers, said engine including fuel inlet port means extending through an end wall and exhaust port means extending through an end wall, said port means communicating into said combustion chamber and being sequentially opened and blocked by face portions of said piston during rotation of the latter.

4. A rotary engine according to claim 1 wherein said engine is a rotary internal combustion engine having combustion means disposed adjacent a plurality of the corners of said square cavity, said variable volume chambers being adjacent said corners, and ignition means responsive to the rotative position of said piston in said cavity to fire said combustion means.

5. A rotary engine according to claim 2 wherein said engine is a rotary internal combustion engine having combustion means disposed adjacent a plurality of the corners of said square cavity, said variable volume chambers being adjacent said corners, inlet port means extending through an end wall and exhaust port means extending through an end wall, said port means communicating into respective chambers and being sequentially opened and blocked by face portions of said piston during rotation of the latter.

References Cited

UNITED STATES PATENTS 3,332,403   7/1967   Reller.

CARLTON R. CROYLE, *Primary Examiner.*

DOUGLAS HART, *Assistant Examiner.*

U.S. Cl. X.R.

230—145